Patented Oct. 15, 1940

2,218,474

UNITED STATES PATENT OFFICE 2,218,474

PLASTIC AND COATING COMPOSITION

Leonard Patrick Moore, Stamford, Conn., assignor to American Cyanamid Company, New York, N. Y., a corporation of Maine No Drawing. Application December 17, 1938, Serial No. 246,499

14 Claims. (Cl. 260—15)

This invention relates to plastic and coating compositions such as paints, varnishes, lacquers, printing inks, laminating compositions, and in general, to film-forming compositions for the production of films requiring good strength, hardness, and adhesive power. More specifically, the invention relates to compositions of the above class containing triazine-aldehyde resins in association with unpolymerized or polymerized esters of organic polybasic acids with polyhydric alcohols, with or without other modifying constituents.

I have found that the triazine-aldehyde condensation products, which may be present in the form of simple alkylol or arylol triazines or simple condensation products of triazines with heterocyclic aldehydes such as furfural or in the form of the corresponding polymerization products of higher molecular weight are compatible with alkyd resins and other polyhydric alcohol-polybasic acid esters throughout a wide range of concentrations. I have also found that these triazine-aldehyde condensation products are compatible with nitrocellulose lacquers containing alykd resins, and with blends of urea or thiourea-aldehyde condensation products with alkyd resins as well as with other modified alkyd resin compositions as will subsequently be described in detail.

The incorporation of triazine-aldehyde condensation products such, for example, as melamine formaldehyde resins into alkyd resin compositions of the above described and other types results in important improvements in the resulting plastic and coating compositions. One of the chief advantages obtained by such a blend is the remarkable improvement in heat resistance of the resulting compositions, which permits them to be hardened at much higher temperatures with correspondingly reduced baking schedules. Another remarkable characteristic of the blending of these two classes of resins is the resistance of the resulting products to weather exposure which results in outdoor paints, varnishes, and enamels of longer effective life. Further advantages are improvements in gloss and color retention of paints and lacquers incorporating a blend of these two classes of materials.

With some alkyd resins, such as the oil or oil acid modified alkyds, triazine-aldehyde condensation products containing any desired ratio of formaldehyde may be used. With other alkyds, such as the straight or fatty acid modified glycerol or glycol phthalates, fumarates or maleates, the optimum compatibility is obtained with triazine-aldehyde condensation products in which the two constituents are reacted in ratios of 1:3.5 to 1:4.5. Still other alkyds, such as those containing polyhydric alcohol esters of aliphatic dibasic acids, for example, the glycol sebacates, are compatible with triazine-aldehyde condensation products of a wide range of triazine-aldehyde ratios, but the physical characteristics of the blend will vary with a variation in the amount of aldehyde used.

Any triazine containing one or more amino or imino or amido groups may be reacted with any aldehyde, or mixture of aldehydes to prepare condensation products falling within the scope of the invention. For example, melamine, formoguanamine, mono-amino 1,3,5-triazine, ammeline, ammelide, melam, melem, halogenated compounds such as monochloro diamino 1,3,5-triazine obtainable from syanuric chloride, hydrocarbon substituted triazines such as phenyl diamino 1,3,5-triazine, monomethyl diamino 1,3,5-triazine, triazines containing substituted amino groups such as 2,4,6 tri-ethyl triamino 1,3,5-triazine, or 2,4,6 triphenyl triamino triazine and the like may be used. Any one or more of these, either singly or in admixture may be reacted with any one or more aldehydes such as formaldehyde, acetaldehyde, benzaldehyde, crotonaldehyde, furfural and the like in aqueous or organic solvents. Any suitable molecular ratio of triazine to aldehyde may be used from 1:1 to 1:6, but of course larger or smaller amounts of aldehyde may be employed for special purposes if necessary; ratios up to 1:20 also being useful.

As has been pointed out above, the range of polyhydric alcohol-polybasic acid compounds that can be blended or used in association with the triazine-aldehyde condensation products of the above described classes is a large one. Any resin-ophoric polyhydric alcohol-polybasic acid ester may be used, either of the unmodified or modified type, or any mixture or combination of such an ester in unpolymerized or polymerized condition with other materials of the same or different classes such as cellulose esters or ethers including nitrocellulose, cellulose acetate, cellulose formate, cellulose butyrate or propionate; urea or thiourea-formaldehyde condensation products, or thermoplastic resins such as acrylate resins, vinylite resins, polystyrene resins, and the like; phenol-aldehyde condensation products including particularly the oil soluble condensation products of formaldehyde with alkyl phenols such as p-isopropyl or isobutyl phenol, or any mixtures of these.

Any suitable plasticizers or solvent softeners may be incorporated into mixtures or blends of the above described materials falling within the scope of the invention, and high boiling solvent softeners are particularly useful in the production of lacquers and printing inks. Thus, for example, high boiling solvents or plasticizers which are common solvents both for triazine-aldehyde resins and for the particular type of alkyd resin may be used, for example compounds of the ester type such as diethyl or dibutyl phthalate, dibutyl sebacate, or ethyl or butyl lactate, solvents of the ketonone type such as ethyl or butyl benzoyl benzoate, chlorhydrins such as epichlorhydrin, or such substances as phthalide, sulfonamides, glycol ethers such as "Cellosolve" and the like. High boiling alcohols may also be used, particularly in the formulation of printing inks, in which such compounds as cetyl alcohol, lauryl alcohol, normal octyl alcohol, capryl alcohol, cyclohexanol, methyl cyclohexanol, hydrofurfuryl alcohol, butanol, pentanol or mixtures of isomeric pentanols and the like are particularly useful. Solvents or softeners of other types may also be used such as solvent mineral oils, pine oil, toluol, xylol, castor oil or other non-drying or semi-drying oils, and in general any of the solvents, plasticizers or thinners now employed in the paint, lacquer, varnish and printing ink industries.

Another feature of the invention resides in the preparation of triazine-aldehyde resins under conditions which render them particularly suitable for association or blending with alkyd resins or mixtures containing alkyd resins of the classes which have been described. Although triazine-aldehyde condensations may be carried out under acid or neutral conditions, I have found that the products obtained by condensing triazines with aldehydes in the presence of mild alkaline catalysts are compatible with alkyd resins throughout a wider range of proportions than are those prepared by the other methods. In particular, I have found that the products obtained by carrying out the condensation within a pH range of 7.0 to 9.5 are those of widest utility for blending with alkyd resins.

Catalysts capable of producing this range of alkalinity may be of the type which can readily be removed after the reaction is completed, either by evaporation as in the case of ammonium hydroxide, by decomposition as in the case of certain organic amines, or by precipitation as in the case of the hydroxides of the alkali or alkaline earth metals. Other catalysts may be used which are soluble in the organic solvents used in the preparation of paints and lacquers, such as tetrabutyl amine phosphate. The use of catalysts of these classes of constituents is another important feature of the invention.

The triazine-aldehyde condensation may be carried out under aqueous or non-aqueous conditions, and the condensation products may be used in some cases in the form of the simple alkylol or arylol triazines which constitute the first or intermediate condensation products. In most cases, however, it is preferable to employ these condensation products in the more completely reacted or polymerized state which results from further heating, and preferably in solution in organic solvents.

One method of preparing the triazine-aldehyde condensation products in the state best suited for incorporation in alkyd resin lacquers or enamels is therefore to react a triazine such as melamine, formoguanamine or the like with an aldehyde such as formaldehyde until the mono, di, tri, tetra or other methylol triazine has been formed, depending on the amount of formaldehyde used. This reaction may take place in the presence of water or under anhydrous conditions by the use of paraformaldehyde in an organic solvent such as butanol, acetone, or the like, and preferably at a pH of about 8.5. When the methylol triazine stage has been reached the alkali is preferably neutralized by the addition of an inorganic acid such as phosphoric acid, additional butanol or other organic solvent is added, and any water that may be present is removed by azeotropic distillation. Heating of the solution is then continued until the desired stage of polymerization has been reached, whereupon a lacquer material suitable for admixture or blending with alkyd resins is obtained.

The invention will be illustrated in greater detail by the following examples. It should be understood, however, that although these examples describe certain of the more specific features of the invention they are given primarily for illustrative purposes, and that the invention in its broader aspects is not limited thereto.

EXAMPLE 1

365 parts by weight of 37% formalin are neutralized with sodium hydroxide solution to pH=8.5, 126 parts of melamine are added, and the mixture is refluxed for 1.5–2 hours. 613 parts of n-butanol and 1.7 parts of 85% phosphoric acid are then added, the butanol being introduced gradually in small amounts so that a clear solution is maintained. This solution is refluxed for a further period of about one hour, after which it is dehydrated by distilling off a butanol-water mixture. Preferably this mixture is condensed, the water separated out by gravity and the butanol returned to the still so that the process is continuous. Instead of butanol, a corresponding amount of toluene may be used if desired.

The resin solution so obtained is well suited for blending with a wide variety of alkyd resin solutions or dispersions for the production of paints, lacquers and varnishes of improved heat and water resistance and color retention. For example, it may be blended with an oxidizing type alkyd resin solution such as is used for air-drying and baking clear finishes and for enamels in white and light shades for spray application. Such a resin solution may be prepared as follows:

*Resin A*

115 parts of C. P. glycerine, 187 parts of castor oil and 185 parts of phthalic anhydride are heated to 400° F. in 3 hours and then gradually to 530° F. during 1.5 hours longer. The batch is held at this temperature until an acid number of 12 or lower is obtained, after which it is cooled to about 275–300° F. Suitable amounts of cobalt drier are then added, and the batch is diluted with xylene to a 50% solution.

A similar drying type resin which may be blended with the triazine-aldehyde resin solution described above is the following:

Resin B 148 parts by weight of phthalic anhydride, 101 parts of glycerine and 123 parts of soya bean fatty acids are heated to 425° F. in 3 hours and held at this temperature for an acid number of 10–12. Suitable amounts of toluene, hydrogenated naphtha, xylol or other solvent are then added, and the solution is agitated at 200° F. until clear.

Blends of the triazine-aldehyde resin solution with the above and similar drying type resins are preferably made on the basis of 15–60 parts of the triazine resin to 85–40 parts of the alkyd in the formulation of baking enamels. For example, an enamel of the following composition is well suited for automobile finishes.

Blue enamel

|  | Parts |
|---|---|
| Resin A (50% solution) | 130 |
| Melamine-aldehyde resin (50% solution) | 70 |
| Prussian blue | 25 |
| Thinner | 60 |

The pigment is preferably ground into the resin solutions in a pebble mill. The enamel sets up rapidly and is therefore well suited for spray application to bare sheet steel, bonderized steel or over a priming coat. When baked for one hour at 225° F. it produces a hard, glossy film of excellent water resistance. For air-drying enamels .05 to .10 part of cobalt per 100 parts solid resin and .1 to .2 part of lead should be added as naphthalene or linoleate drier, and the enamel should be aged for several days to develop gloss and drying speed. Smaller amounts of driers may be added to the baking enamels if desired.

Blends of melamine-aldehyde resins with alkyds of the type of Resin A and Resin B are also compatible with nitrocellulose. For example, a clear furniture lacquer may be based on the following formula:

|  | Parts |
|---|---|
| Dry nitrocellulose | 100 |
| Resin A (50% solution) | 100 |
| Melamine-aldehyde resin (50% solution) | 50 |
| Dibutyl phthalate lacquer solvent—to spray consistency | 10 |

EXAMPLE 2

The triazine aldehyde resins are also compatible with oil-modified alkyd resins containing drying oils such as linseed oil, perilla oil, oiticica oil, tung oil and the like. A typical resin of this class may be prepared as follows:

Resin C 1640 parts of phthalic anhydride, 960 parts of glycerine, 1104 parts of linseed fatty acids, 1104 parts of refined linseed oil and 552 parts of castor oil are heated to 500° F. and held at this temperature for about 2 hours. The resin is cooled to 300° F. and should have an acid number of about 6–9. It is then agitated with about 5100 parts of toluol until a clear 50% solution is obtained.

This resin is compatible throughout a wide range of proportions with the triazine-aldehyde resin described in Example 1, and may be mixed with it in the preparation of clear finishes for air-drying and baking, undercoats and enamels in any desired color for automobiles, metal furniture and the like. The blend is particularly advantageous for use in the preparation of pigmented lacquers of good through-hardening and weather resisting properties as it can be used as a grinding vehicle for a wide variety of pigments.

Triazine resins of higher aldehyde ratios than the resin described in Example 1 can also be blended with Resin C by reason of its oil length. For example, a resin solution prepared from 126 parts of melamine and 406 parts of 37% formaldehyde solution by the procedure outlined in Example 1 can be mixed with this resin. When used in amounts of 15–25%, based on the weight of the alkyd resin, it improves the hardness and color retention of lacquers and other coating compositions containing the blend, and permits the use of shorter baking schedules at higher temperatures.

A pigmented enamel using larger quantities of melamine resin in conjunction with this alkyd resin is the following:

Green enamel

|  | Parts |
|---|---|
| Melamine-formaldehyde resin (50% solution) prepared as in Example 1 | 80 |
| Resin C (50% solution) | 120 |
| Lamp black | 3 |
| Barytes | 3 |
| Chrome orange | 4 |
| Chrome yellow dark | 4 |
| Zinc drier | 1 |
| Thinner | 65 |

Improved results are also frequently obtained when the triazine resins are blended with two or more alkyd resins having complementary properties. By this procedure it is possible to incorporate any desired amount of triazine resin into a wide variety of plastic and coating compositions even in cases where one of the alkyd resin components is not altogether compatible in the desired range, for the other alkyd component can be made to serve the purpose of a mutual solvent or plasticizer. An example of a composition containing two alkyd resins of different properties is the following:

Black enamel

|  | Parts |
|---|---|
| Melamine-formaldehyde resin, prepared as in Example 1, (50% solution) | 30 |
| Resin A (50% solution) | 80 |
| Resin C (50% solution) | 90 |
| Carbon black | 7 |
| Zinc manganese drier (3% solution) | 2 |
| Thinner | 100 |

This composition is well suited for use as an automotive baking enamel, for tin coating, wood dipping, signs, toy enamel, and for many metal surfaces such as steel, iron, tin, copper, brass, die cast zinc and the like. When baked on any of these surfaces for 40 minutes at 250° F. or for 20 minutes at 300° F. it forms a hard, tough film of good gloss and excellent weather resistance.

EXAMPLE 3

High-bake enamels of the refrigerator type are greatly improved by the incorporation therein of triazine-aldehyde resins in amounts of 20–40%, based on the total resin content. A suitable alkyd resin for blending is the following:

Resin D

An oil modified alkyd of 300 oil length is prepared by reacting 7 mols of phthalic anhydride, 7 mols of glycerine and 2100 parts of castor oil at 530° F. to an acid number of 6–8. This resin is dissolved in xylene at elevated temperatures to a 60% solution.

The following white refrigerator enamel is typical of a large class that can be prepared with such resins. In all cases the incorporation of substantial amounts of triazine-aldehyde resins such as melamine-formaldehyde condensation products will improve the gloss, hardness, color retention and grease resistance of the enamel.

| | Parts |
|---|---|
| Melamine-formaldehyde resin (50% solution) prepared as in Example 1 | 60 |
| Resin D (60% solution) | 28 |
| Resin B (50% solution) | 92 |
| Titanium dioxide | 95 |
| Zinc oxide | 5 |
| Thinner | 100 |

The resin solutions are preferably blended at high temperature and the pigments are ground into them in a ball or pebble mill. Cobalt and lead driers may be added in small amounts (0.02% and 0.4% respectively) when lower baking schedules are employed, although they may be entirely omitted when using the high baking temperatures made possible by the incorporation of the melamine-formaldehyde resin. Thus, for example, the resin-pigment grind of the composition described may be thinned to spraying consistency with a mixture of equal parts of xylene and butanol and sprayed on bare sheet steel surfaces, or over a primer, and baked at 250° F. for 30 minutes or at 310° F. for 15 minutes. The resulting coat has a high gloss and good color retention upon exposure to light.

Example 4

When used in combination with alkyd resins of the non-drying type the triazine-aldehyde condensation products will improve the hardness and heat resistance of clear and pigmented lacquers and coating compositions. This combination of resins may be employed in straight alkyd type baking enamels or in nitrocellulose lacquers.

A melamine-formaldehyde condensation product that is well suited for this purpose may be prepared according to the method outlined in Example 1. Other condensation products having different triazine-formaldehyde ratios and prepared under either aqueous or non-aqueous condition may also be used, however; for example, a product may be prepared under anhydrous conditions by the following method:

126 parts melamine, 285 parts by volume of alcoholic formaldehyde solution of 42% strength, 300 parts by volume of alcohol and 1.25 parts by volume of 87% phosphoric acid are heated together under reflux to boiling. The heating is continued for from 45 minutes to 1 hour after which the resulting clear solution is adjusted to 50% solids content with further amounts of butanol.

This method may also be employed for the production of anhydrous aldehyde condensation products from other triazines having at least one reactive amine group such as diamino 1.3.5 triazine, mono-amino 1.3.5 triazine, ammeline, ammelide, acetoguanamine, 2.4.6 triethyl triamino-1.3.5 triazine and the like, or from polynuclear triazine compounds of the secondary amine type such as melam and melem. These compounds, either singly or in admixture, may be condensed with aldehydes such as formaldehyde, paraformaldehyde, acetaldehyde, paraldehyde, benzaldehyde, furfural and the like in the presence of organic solvents such as glycerol, glycol, butanol, benzene, xylene, toluol, mineral spirits, or other solvents commonly used as lacquer thinners. The condensation may be carried out under alkaline conditions, such as a pH range of 7.5 to 9.5, although in some cases a pH of 5–7 may be employed. In either case, however, the alkalinity or acidity is preferably neutralized after the condensation is completed. The resulting resin solutions are well suited for blending with alkyd resins of the types described in this and other examples.

A representative non-drying type alkyd resin which is suitable for blending with any of the foregoing triazine-aldehyde resin solutions may be prepared by the following process:

Resin E 1480 parts of phthalic anhydride, 1050 parts of glycerine, and 1000 parts of coconut oil fatty acids are charged into a resin kettle and heated to 425° F. as quickly as possible. The batch is held at this temperature for an acid number of 6–8, whereupon it is cut with about 4300 parts of toluol to a 50% solution.

From 3 to 5 parts by weight of this resin solution are preferably blended with 1 part of a 50% solution of one of the triazine-aldehyde resins described above and 10% of ethyl lactate is added. The lacquer is reduced to spraying consistency with toluol and may be applied as a clear lacquer to sheet metal, wood, or painted surfaces. When baked for 15–30 minutes at 210–250° F. it forms a hard, non-yellowing coating of good characteristics.

The blend of alkyd and triazine resins may also be used in admixture with oxidizing type resins for the production of pigmented lacquers. For example, the following formulation may be employed.

| | Parts |
|---|---|
| Toluidine Red | 20 |
| Triazine-formaldehyde resin (50% solution) prepared as described above | 60 |
| Resin E | 60 |
| Resin A | 80 |
| Thinner | 65 |

The pigment is ground in a part of the alkyd resin solutions, the remainder of the alkyds and the triazine resin solution are incorporated in a paint mixer and the mixture is thinned with xylol, butanol, or a mixture of the two. The lacquer is suitable for use in automotive finishing, on stamped metal parts, toys and wood surfaces and may be baked at 190° F. to 350° F. for a suitable length of time.

Example 5

Excellent baking enamels for metal furniture, cabinets, shelves, toys, stoves, table tops, stamped metal, signs, trucks and similar purposes requiring a hard and wear-resisting coating can be formulated with drying oil modified alkyd resins in conjunction with triazine-aldehyde condensation products. An example of an alkyd resin well suited for these purposes is the following:

Resin F 1036 parts of phthalic anhydride, 700 parts of glycerine, 1085 parts of soya bean fatty acids and 875 parts of soya bean oil are charged into a reaction kettle and heated gradually to 500° F. The heating is continued at this temperature until reaction is complete after which the batch is cooled and diluted with xylol.

An enamel especially suitable for application by dipping, roll coating or spraying or similar inexpensive methods is the following:

| | Parts |
|---|---|
| Chrome yellow | 80 |
| Melamine-formaldehyde resin (50% solution) prepared as in Example 4 | 40 |
| Ester gum (rosin glyceride) | 20 |
| Resin F (50% solution) | 70 |
| Resin D (60% solution) | 30 |
| Thinner | 50 |

The resins are preferably blended at elevated temperatures, the pigment is incorporated by grinding and the mixture reduced to the proper consistency with the thinner. The enamel may be hardened to a tough and wear-resisting coat by baking at temperatures of 180–350° F. for suitable lengths of time.

EXAMPLE 6

In the preceding examples typical lacquers of the straight alkyd and alkyd-nitrocellulose types have been described. I have also found that improved results are frequently obtained by incorporating the triazine-aldehyde condensation products with mixtures of alkyd resins and urea-formaldehyde resins such as are now in use for refrigerator type enamels, outdoor baking enamels and the like. The resulting blend may be used as a clear varnish or as a pigmented enamel.

It can also be used in admixture with nitrocellulose, China-wood oil, castor oil, chlorinated rubber and, to a more limited extent, with oil varnishes. It may be plasticized by the addition of dibutyl phthalate or other plasticizers of this type.

Resin G

A urea formaldehyde resin that may be used for this purpose is prepared as follows:

5 moles of formaldehyde in the form of a 37% solution are heated with 2 moles of urea for about two hours. An excess of butanol is then added and the heating is continued with distillation of a butanol-water mixture to give an organic solvent soluble material such as described in Ripper Reissue Patent No. 19,463. When the removal of water is substantially complete the resin is dispersed to a 50% solution in a mixture of butanol and xylol.

An example of a formulation using a triazine-aldehyde resin in conjunction with the foregoing and an alkyd type resin is the following:

Red baking enamel

| | Parts |
|---|---|
| Toluidine red Roner | 20 |
| Melamine-formaldehyde resin (50% solution) prepared as in Example 4 | 50 |
| Resin G (50% solution) | 50 |
| Resin A (50% solution) | 100 |
| Butanol | 10 |
| Coal tar naphtha—To spraying consistency. | |

This enamel may be applied directly or over a primer to sheet metal, bicycle frames, wood surfaces and the like. Baking temperatures of 225–350° F. may be used, and at the higher temperatures times as short as 5–15 minutes will give a hard, glossy and water and grease resistant film.

An especially good primer for use in conjunction with the above enamel is the following:

| | Parts |
|---|---|
| Zinc oxide | 160 |
| Resin C (50% solution) | 180 |
| Xylol | 20 |
| Mineral spirits—To spraying consistency. | |

This primer is preferably baked on sheet metal for 45–60 minutes at 350° F., and the red enamel is then applied as described above.

EXAMPLE 7

The urea-formaldehyde resin G described in Example 6 may also be applied in admixture with triazine-formaldehyde resins and alkyd resins in the formulation of clear lacquers. A drying oil resin suitable for this purpose is

Resin H 14 moles of phthalic anhydride, 11.4 moles of glycerine, 1420 lbs. of linseed fatty acids and 1045 lbs. of refined linseed oil are reacted together at 430° F. to an acid number of 50–60. The resin is cooled and dissolved in xylene to a 50% solution.

A clear enamel that is well suited for application to wood, metal, paper, linoleum, or for the waterproofing of porous surfaces is the following:

| | Parts |
|---|---|
| Resin G (50% solution) | 40 |
| Melamine-formaldehyde resin (50% solution) prepared as in Example 1 | 50 |
| Resin H (50% solution) | 36 |
| Chlorinated diphenyl | 15 |
| Dibutyl phthalate | 15 |
| Thinner | 50 |

Another formulation of the same type that is well suited for clear or pigmented leather lacquers is as follows:

| | Parts |
|---|---|
| Melamine-formaldehyde resin (50% solution) | 60 |
| Resin A (50% solution) | 60 |
| Polyterpene plasticizer | 40 |
| Thinner | 40–70 |

The enamel may be baked at 150–250° F. for suitable periods of time.

EXAMPLE 8

Another class of coatings in which the principles of the present invention are of great value is that in which a paint, lacquer, or varnish containing a triazine-aldehyde condensation product such as a melamine-formaldehyde resin is applied as a finish over a primer or surfacing coat containing an alkyd type resin. In finishes of this class the hardness, gloss retention and resistance to weathering of the triazine resins is available in the outer protecting coat or coats while the primer and sealing coats may consist of straight alkyd resin lacquers or of alkyds modified with other constituents. In a composite coat of this type the compatibility of the triazine resins with alkyds results in a uniform blend of the several coats, while the separate application permits the use of mineral spirits and other cheap solvents for the straight alkyd resin coat that are not good solvents for the triazine resins.

When utilizing this feature of the invention it is also possible to use those classes of triazine-aldehyde resins that have the greatest hardness and weather resistance even though they may have only a limited range of compatibility with the resins contained in the undercoats. It is also possible, if desired, to utilize dispersions of triazine-aldehyde resins in water or other cheap solvents, such as partially reacted alkylol melamines which are water soluble and which can be hardened and polymerized by further heating after application as an outer coat.

An alkyd resin which is well suited for use in priming or surfacing coats under an outer coat containing a triazine-aldehyde resin is the following:

Resin I 148 parts of phthalic anhydride, 87 parts of glycerine, 40 parts of China-wood oil, 120 parts of mixed drying oils and 56 parts of wood rosin are heated rapidly to 450° F. and held at this temperature until a sample hardens at 45° C. The resin is then cooled and dissolved in xylene to a 60% solution.

This may be used in the preparation of a baking primer-surfacer for use on automobiles or metal furniture. For example, the following composition may be prepared:

|  | Parts |
|---|---|
| Iron oxide | 720 |
| Carbon black | 20 |
| China clay | 180 |
| Talc | 80 |
| Resin I (60% solution) | 370 |
| Coal tar naphtha | 800 |
| Liquid drier (4% Co) | 0.075 |
| Liquid drier (16% Pb) | 0.25 |

The coating may be dried overnight or baked for one hour at 200–250° F.

A straight melamine-formaldehyde lacquer may be prepared according to the method outlined in Example 4 and applied to sheet metal such as an automobile body as finishing coat over one or more coats of the foregoing enamel. Alternatively, an enamel containing a blend of a melamine-formaldehyde resin with an oxidizable alkyd resin may be employed, such as the blue enamel described in Example 1. Similarly, a clear or pigmented lacquer containing nitrocellulose may be applied as the finishing coat, for example a black enamel of the following composition:

|  | Parts |
|---|---|
| Dry nitrocellulose | 100 |
| Melamine-formaldehyde resin solution (50% prepared as in Example 1) | 200 |
| Resin E (50% solution) | 300 |
| Dibutyl phthalate | 10 |
| Blown castor oil | 10 |
| Carbon black | 40 |

This mixture is thinned to spraying consistency and applied as a finishing coat over the above described primer or surfacing coat or coats. It is then baked for 18 minutes at 180° F.

Example 9

127 parts of ammeline (2-hydroxy 4.6 diamino 1.3.5 triazine) are mixed with 486 parts of 37% formaldehyde and sodium hydroxide solution is added until the pH of the mixture is 8.0. The mixture is refluxed for 2–3 hours, or until reaction is complete, after which 700 parts of butanol are added and sufficient 85% phosphoric acid to neutralize the free alkali. Water and butanol are distilled off with continuous separation and return of the butanol until the mixture is dehydrated. The concentration is then adjusted to 50% solids.

A lacquer suitable for the coating of paper or leather is prepared by mixing 160 parts of the above resin solution with 100 parts of nitrocellulose and 80 parts of an alkyd resin obtained by reacting one mole of succinic acid, one mole of phthalic anhydride and 2 moles of diethylene glycol together with 75 parts of castor oil and thinning with xylol to the proper consistency.

Similar lacquers well suited for the same purpose are obtained by substituting for the ammeline-formaldehyde resin equivalent amounts of a formaldehyde or acetaldehyde condensation product of a hydrocarbon substituted triazine such as triethyl or triphenyl melamine.

Example 10

146 parts of 2 chloro 4.6 diamino 1.3.5 triazine are mixed with 325 parts of 37% formaldehyde. The mixture is boiled until a clear solution is obtained, after which 175 parts of methanol or ethanol are added. The solution is then dehydrated by vacuum distillation with continuous introduction of additional alcohol, either as liquid or as vapor, until a clear syrup is obtained. An equal weight of octyl alcohol is then added.

This resin solution is well suited for incorporation into heat drying inks, such as typographic ink, roll coating ink or the like. An alkyd type resin well suited for use in conjunction therewith is the following:

Resin J

Heat together 43.5 parts of phthalic anhydride, 29 parts of 98% C. P. glycerine and 37 parts of soya fatty acids at suitable temperatures until completely reacted. Dilute with "Gulf FD Ink Oil" (a solvent mineral oil having a boiling range of 500–550° F.) to a 50% solution.

Suitable formulations using these ingredients may include the following:

|  | Formula No. | | |
|---|---|---|---|
|  | 1 | 2 | 3 |
| Triazine resin (50% solution) | 40 | 15 | 25 |
| Resin J (50% solution) | 50 | 70 | 63 |
| "Peerless Carbon Black" or other pigment | 10 | 15 | 12 |

Instead of carbon black, other pigments may be substituted in varying amounts to produce inks of different colors. For example, 15–20 parts of iron blue, 25–35 parts of titanium oxide, 35–40 parts of lithopone, 15–20 parts of toluidine or Lithol Red, or 30–35 parts of chrome yellow may be substituted if desired.

Printing inks well suited for heat drying are also obtained when other triazine-aldehyde condensation products are substituted, in whole or in part, for the one described above. For example, one mole of melam may be heated with 10 moles of an anhydrous solution of formaldehyde or paraformaldehyde in an alcohol such as ethanol or butanol, preferably with the addition of a small amount of sulfuric acid. When a clear solution is obtained the mixture is diluted with further amounts of alcohol to a 50% solution and used as above described.

Example 11

A melamine-formaldehyde condensation product is prepared as in Example 1, but 600 parts of heavy pine oil are used instead of the N-butanol. When the resin solution is obtained, sufficient octyl alcohol is introduced to make up a 50% melamine resin solution in a solvent consisting of 30 parts heavy pine oil and 20 parts octyl alcohol.

Black heat-drying typographic inks may be prepared from this solution, for example as follows:

|  | Formula No. | | |
| --- | --- | --- | --- |
|  | 1 | 2 | 3 |
| Triazine resin (50% solution) | 50 | 40 | 15 |
| Resin J (50% solution) | 45 | 50 | 70 |
| "Peerless Carbon Black" | 10 | 5 | 10 |
| Toning iron blue | 5 | 5 | 5 |

In the foregoing formulations, the synthetic resin is dissolved in an aromatic mineral oil cut having a boiling range of 420–530° F. and known commercially as "Union 4060–0 Solvent."

EXAMPLE 12

A melamine-formaldehyde condensation product is prepared under anhydrous conditions as described in Example 4. After reaction is completed the solution is diluted to 40% solids in a mixture of equal parts of hydrofurfuryl alcohol and "Gulf FD Ink Oil." Black roll out inks well suited for heat drying at 250° F. for 10–15 minutes may be prepared from this resin solution by the following formulations:

|  | Formula No. | | |
| --- | --- | --- | --- |
|  | 1 | 2 | 3 |
| Melamine resin (40% solution) | 50 | 40 | 30 |
| Resin E (50% solution in "Gulf FD Ink Oil") | 20 | 28 | 40 |
| Blown castor oil | 15 | 20 | 15 |
| "Peerless carbon black" | 14 | 10 | 14 |
| Dry alkali blue | 1 | 2 | 1 |

Other pigments may be substituted for those listed above using, for example, the pigments and quantities illustrated in Example 10.

EXAMPLE 13

One mole of 2.4 diamino 1.3.5 triazine is heated with 3 moles of 37% formaldehyde solution for about 4 hours, or until a clear solution is obtained. The solution is dehydrated by refluxing with cyclohexanol, additional cyclohexanol being added continuously or intermittently so that at the end a 40–50% solution of the resin in cyclohexanol is obtained.

A lithographic tin printing ink may be prepared from this resin according to the following formulation:

| | Parts |
| --- | --- |
| Formoguanamine-aldehyde resin in cyclohexanol (40–50% solution) | 15–40 |
| Resin F (60% solution in cyclohexanol) | 43 |
| Resin B (60% solution in cyclohexanol) | 17 |
| "Peerless Carbon Black" | 10–15 |

Instead of carbon black other pigments may be substituted as outlined in Example 1.

EXAMPLE 14

Rotogravure inks may also be prepared using low boiling solvents for air drying. Inks of this class may be air dried to prevent spreading followed by heating at 250° F. for 5–15 minutes to set the resins. A 50% solution of a melamine-formaldehyde resin in butanol, toluol, xylol, methyl, ethyl or propyl alcohols is prepared under anhydrous conditions using the procedure described in Example 4. Typical rotogravure inks containing this resin together with alkyd resins may be based on the following formulations:

| | Parts |
| --- | --- |
| Melamine-formaldehyde resin (50% solution) | 15–40 |
| Resin B (50% solution) | 20–30 |
| Resin E (50% solution) | 10 |
| Pigment (as outlined in Example 10) | 15–35 |

In some cases castor oil up to 15 parts may be added to the above formulation as a plasticizer, although with alkyds of the oil lengths indicated this is not always necessary.

What I claim is:

1. A rapid curing film-forming coating composition yielding light-resistant films comprising a compatible blend of oil acid modified alkyd resin and aminotriazine-aldehyde resin in which the alkyd resin imparts toughness and flexibility to the composition and the aminotriazine-aldehyde resin imparts the properties of hardness, rapid curing and light resistance.

2. A rapid curing film-forming coating composition yielding light-resistant films comprising a compatible blend of oil acid modified alkyd resin and melamine-aldehyde resin in which the alkyd resin imparts toughness and flexibility to the composition and the melamine-aldehyde resin imparts the properties of hardness, rapid curing and light and heat resistance.

3. A rapid curing film-forming coating composition yielding light-resistant films comprising a compatible blend of drying-oil acid modified alkyd resin and melamine-aldehyde resin in which the alkyd resin imparts toughness, flexibility and adhesiveness to the composition and the melamine-aldehyde resin imparts the properties of hardness, rapid curing and light and heat resistance.

4. A rapid curing film-forming coating composition yielding light-resistant films comprising a compatible blend of drying-oil modified alkyd resin and melamine-aldehyde resin in which the alkyd resin imparts toughness, flexibility, adhesiveness and drying properties to the composition and the melamine-aldehyde resin imparts the properties of hardness, rapid curing and light and heat resistance.

5. A composition of matter comprising a compatible blend of about 15–60 parts of an aminotriazine-aldehyde resin and about 85–40 parts of an oil acid modified alkyd resin.

6. A composition of matter comprising a compatible blend of about 15–60 parts of a melamine-aldehyde resin and about 85–40 parts of an oil acid modified alkyd resin.

7. A rapid curing film-forming coating composition yielding heat-resistant and water-resistant films comprising a compatible blend of an oil acid modified alkyd resin and a urea-formaldehyde resin together with an aminotriazine-aldehyde resin, in which the alkyd resin imparts toughness and flexibility to the composition and the aminotriazine-aldehyde resin imparts the properties of rapid curing and light and heat resistance.

8. A rapid curing film-forming coating composition yielding heat-resistant and water-resistant films comprising a compatible blend of an oil acid modified alkyd resin and a urea-formaldehyde resin together with a melamine-aldehyde resin, in which the alkyd resin imparts toughness and flexibility to the composition and the melamine-aldehyde resin imparts the properties of rapid curing and light and heat resistance.

9. A rapid curing film-forming coating composition yielding heat-resistant and water-resistant films comprising a compatible blend of 15–60 parts of an aminotriazine-aldehyde resin and 85–40 parts of a mixture of oil acid modified alkyd resin and urea-formaldehyde resin.

10. A rapid curing film-forming coating composition yielding heat-resistant and water-resistant films comprising a compatible blend of 15–60 parts of a melamine-aldehyde resin and 85–40 parts of a mixture of oil acid modified alkyd resin and urea-formaldehyde resin.

11. A rapid curing film-forming coating composition yielding light-resistant and water-resistant films comprising a compatible blend of an aminotriazine-aldehyde resin with a mixture of oil acid modified alkyd resin and nitrocellulose, in which the alkyd resin imparts toughness and flexibility to the composition and the aminotriazine-aldehyde resin imparts the properties of rapid curing and light and heat resistance.

12. A rapid curing film-forming coating composition yielding light-resistant and water-resistant films comprising a compatible blend of a melamine-aldehyde resin with a mixture of oil acid modified alkyd resin and nitrocellulose, in which the alkyd resin imparts toughness and flexibility to the composition and the melamine-aldehyde resin imparts the properties of rapid curing and light and heat resistance.

13. A rapid curing film-forming coating composition yielding light-resistant and water-resistant films comprising a compatible blend of 15–60 parts of an aminotriazine-aldehyde resin and 85–40 parts of a mixture of oil acid modified alkyd resin and nitrocellulose.

14. A rapid curing film-forming coating composition yielding light-resistant and water-resistant films comprising a compatible blend of 15–60 parts of a melamine-aldehyde resin and 85–40 parts of a mixture of oil acid modified alkyd resin and nitrocellulose.

LEONARD P. MOORE.